US011461264B2

(12) United States Patent
Tang

(10) Patent No.: US 11,461,264 B2
(45) Date of Patent: Oct. 4, 2022

(54) METHOD AND SYSTEM FOR FLEXIBLE DEPLOYMENT AND EASY CPLD MANAGEMENT OF BACKPLANE

(71) Applicant: INSPUR SUZHOU INTELLIGENT TECHNOLOGY CO., LTD., Jiangsu (CN)

(72) Inventor: Chuanzhen Tang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/615,210

(22) PCT Filed: Oct. 31, 2019

(86) PCT No.: PCT/CN2019/114524
§ 371 (c)(1),
(2) Date: Nov. 30, 2021

(87) PCT Pub. No.: WO2021/017232
PCT Pub. Date: Feb. 4, 2021

(65) Prior Publication Data
US 2022/0206982 A1 Jun. 30, 2022

(30) Foreign Application Priority Data
Jul. 29, 2019 (CN) .......................... 201910686459.4

(51) Int. Cl.
*G06F 13/40* (2006.01)
*G06F 8/654* (2018.01)
*G06F 13/42* (2006.01)

(52) U.S. Cl.
CPC .......... *G06F 13/4027* (2013.01); *G06F 8/654* (2018.02); *G06F 13/4282* (2013.01); *G06F 2213/0016* (2013.01)

(58) Field of Classification Search
CPC ... G06F 13/4027; G06F 13/4282; G06F 8/654
See application file for complete search history.

(56) References Cited

U.S. PATENT DOCUMENTS

| | | | | |
|---|---|---|---|---|
| 11,113,166 | B2 * | 9/2021 | Yang | .................... G06F 11/0748 |
| 2008/0313312 | A1 * | 12/2008 | Flynn | ..................... H04L 67/02 |
| | | | | 709/224 |

(Continued)

FOREIGN PATENT DOCUMENTS

| | | |
|---|---|---|
| CN | 205091731 U | 3/2016 |
| CN | 107577569 A | 1/2018 |

(Continued)

OTHER PUBLICATIONS

International Search Report and English Translation cited in PCT/CN2019/114524 dated Apr. 24, 2020, 9 pages.

(Continued)

*Primary Examiner* — Henry Tsai
*Assistant Examiner* — Christopher A Daley
(74) *Attorney, Agent, or Firm* — Cooper Legal Group LLC

(57) ABSTRACT

A method and system for flexible deployment and easy CPLD management of a backplane are provided. An EEPROM module is added on a backplane; a connection configuration mode of a hard disk backplane and a motherboard controller is stored in the EEPROM module; and a CPLD reads connection relationship information from the EEPROM by means of I2C so as to perform a lighting function and other similar control functions. In addition, by means of adding a connection of a BMC management module on a motherboard to the EEPROM module, when the configuration is changed, a BMC directly upgrades the stored information in the EEPROM module by means of an I2C bus without needing to disassemble a machine. In the method and system, only two pins of the CPLD need to be (Continued)

occupied, without needing to consider that more CPLD pins are required for more complex configurations.

6 Claims, 2 Drawing Sheets

(56) References Cited

U.S. PATENT DOCUMENTS

| | | | |
|---|---|---|---|
| 2011/0179211 A1 | 7/2011 | Li et al. | |
| 2016/0283424 A1* | 9/2016 | Richardson | G06F 11/3058 |
| 2017/0139797 A1* | 5/2017 | Wang | G06F 13/364 |
| 2018/0293147 A1* | 10/2018 | Bikumala | G06N 20/00 |
| 2019/0220340 A1* | 7/2019 | Chou | G06F 11/0709 |
| 2020/0393875 A1* | 12/2020 | Kennedy | G06F 1/18 |

FOREIGN PATENT DOCUMENTS

| | | |
|---|---|---|
| CN | 107766213 A | 3/2018 |
| CN | 107832199 A | 3/2018 |
| CN | 108874712 A | 11/2018 |
| CN | 108897577 A | 11/2018 |
| CN | 109683679 A | 4/2019 |
| CN | 109753442 A | 5/2019 |
| CN | 109857622 A | 6/2019 |
| CN | 209030246 U | 6/2019 |
| KR | 20020038874 A | 5/2002 |

OTHER PUBLICATIONS

First Office Action and English Translation cited in CN201910686459.4 dated May 29, 2020, 12 pages.
Written Opinion and English Translation cited in PCT/CN2019/114524 dated Apr. 24, 2020, 7 pages.
Supplementary Search Report cited in CN201910686459.4 dated Aug. 18, 2020, 2 pages.

* cited by examiner

METHOD AND SYSTEM FOR FLEXIBLE DEPLOYMENT AND EASY CPLD MANAGEMENT OF BACKPLANE

RELATED APPLICATION

The present application claims priority to Chinese Patent Application No. 201910686459.4, entitled "Method and System for Flexible Deployment and Easy CPLD Management of Backplane", filed to China Patent Office on Jul. 29, 2019, the entire contents of which are incorporated herein by reference.

TECHNICAL FIELD

The present invention relates to the technical field of storage design, and in particular, to a method and system for flexibly deployment and easy complex programmable logic device (CPLD) management of a backplane.

BACKGROUND ART

With the continuous development of cloud computing, the performance requirements of various large Internet manufacturers for server products become higher and higher. In order to improve storage performance, various large hard disk manufacturers have successively launched non-volatile memory express (NVME) interface solid-state drives (SSDs). NVME interfaces may be directly connected with peripheral component interconnect express (PCIE) ports of central processing units (CPUs) using PCIE buses. Since an indicator lamp is needed to display a working state of a hard disk when the hard disk is working, when the industry has launched an NVME hard disk, a lighting service of the hard disk has also been developed. When the NVME hard disk is directly connected to a CPU, the hard disk is controlled by the CPU, and a lighting function is also derived from the CPU. Intel is taken as a typical representative. With the CPU iterative evolution of Intel, a current lighting channel of a CPU of Intel to an NVME hard disk is connected to a CPLD of a backplane where the hard disk is located through a Virtual Pin Port (VPP) bus, and a specific lighting signal is parsed out by the CPLD to control the turn-on and turn-off of a physical lamp.

Most of current servers are multi-channel servers, i.e. a plurality of CPUs are contained therein, and an NVME hard disk connected to each CPU needs to be lighted under the control of a VPP of the CPU. Likewise, when an NVME hard disk backplane is a multi-interface backplane, for example, four or eight NVME hard disk interfaces are supported, when the multi-interface backplane is connected to the multi-channel server and the CPLD parses a VPP bus protocol, it is necessary to identify a connection mode between the hard disk backplane and a motherboard CPU and also necessary to know which PCIE interface of which CPU is connected, and then lighting is parsed. For example, four NVME hard disks are connected to two CPUs, and there are up to five connection schemes. The current mode is to adopt a dial switch, where at least three dial switches are needed and three signals need to be connected to a CPLD. As the number of hard disks increases and the number of CPUs increases, the number of dial switch signals increases exponentially, which occupies not only a large number of CPLD pins, but also a large amount of printed circuit board (PCB) area for placing the dial switches. Meanwhile, there is a situation that the dial switches dial wrongly during maintenance, so that the product function is affected.

SUMMARY OF THE INVENTION

An object of the present invention is to provide a method and system for flexible deployment and easy CPLD management of a backplane, aiming to solve the problems in the conventional art that a multi-port number of backplanes occupy too many CPLD pins and a dial switch is error-prone, so as to realize occupying fewer CPLD pins and omitting a large number of dial switches.

In order to achieve the above technical object, the present invention provides a method for flexible deployment and easy CPLD management of a backplane. The method includes the following operations:

S1. adding an electrically-erasable programmable read-only memory (EEPROM) on the backplane, and the EEPROM is interconnected with a CPLD and a baseboard management controller (BMC) respectively;

S2. burning a connection relationship information between a hard disk interface of the backplane and a motherboard CPU, in the EEPROM; and S3. the CPLD reading the connection relationship information in the EEPROM after power-on, and parses a VPP protocol bus to obtain a corresponding lighting mode.

Preferably, the EEPROM is connected with the CPLD and the BMC through inter-integrated circuit (I2C) respectively.

Preferably, the number of pins occupied in the CPLD is 2.

Preferably, the method further includes the following operation:

when a connection mode between the CPU and the hard disk interface is changed, the BMC updates the content of the connection relationship information in the EEPROM through an I2C bus, then the whole machine is powered off again and powered on, and the CPLD reads new connection relationship information from the EEPROM to complete a new parsing of the VPP bus.

The present invention also provides a system for flexible deployment and easy CPLD management of a backplane. The system includes:

an EEPROM addition module, configured to add an EEPROM on the backplane, and interconnect the EEPROM with a CPLD and a BMC respectively;

a configuration information burning module, configured to burn connection relationship information about a connection between a hard disk interface of the backplane and a motherboard CPU in the EEPROM; and a protocol parsing module, configured to read, by the CPLD, the connection relationship information in the EEPROM after power-on, and parse a VPP protocol bus to obtain a corresponding lighting mode.

Preferably, the EEPROM is connected with the CPLD and the BMC through I2C respectively.

Preferably, the number of pins occupied in the CPLD is 2.

Preferably, the system further includes:

a connection relationship update module, configured to update, by the BMC, the content of the connection relationship information in the EEPROM through an I2C bus when a connection mode between the CPU and the hard disk interface is changed, then power off the whole machine again and power on, and read, by the CPLD, new connection relationship information from the EEPROM to complete a new parsing of the VPP bus.

The effects provided in the Summary of the Invention are only the effects of embodiments, not all the effects of the invention, and one of the above technical solutions has the following advantages or beneficial effects:

compared with the conventional art, according to the present invention, an EEPROM module is added on a backplane, a connection configuration mode of a hard disk backplane and a motherboard controller is stored in the EEPROM module, and a CPLD reads connection relationship information from the EEPROM by means of I2C so as to perform a lighting function and other similar control functions. In addition, by means of adding a connection of a BMC management module on a motherboard to the EEPROM module, when the configuration is changed, a BMC directly upgrades the stored information in the EEPROM module by means of an I2C bus without needing to disassemble a machine. In the present invention, only two pins of the CPLD need to be occupied, without needing to consider that more CPLD pins are required for more complex configurations. In addition, since dial switches need to be manually set, when there are many dial switches, an operator is prone to errors, which causes product configuration errors and product function abnormalities, and the product quality is directly affected. By means of the present invention, the problems may be effectively avoided.

DETAILED DESCRIPTION OF THE INVENTION

Figure 1:
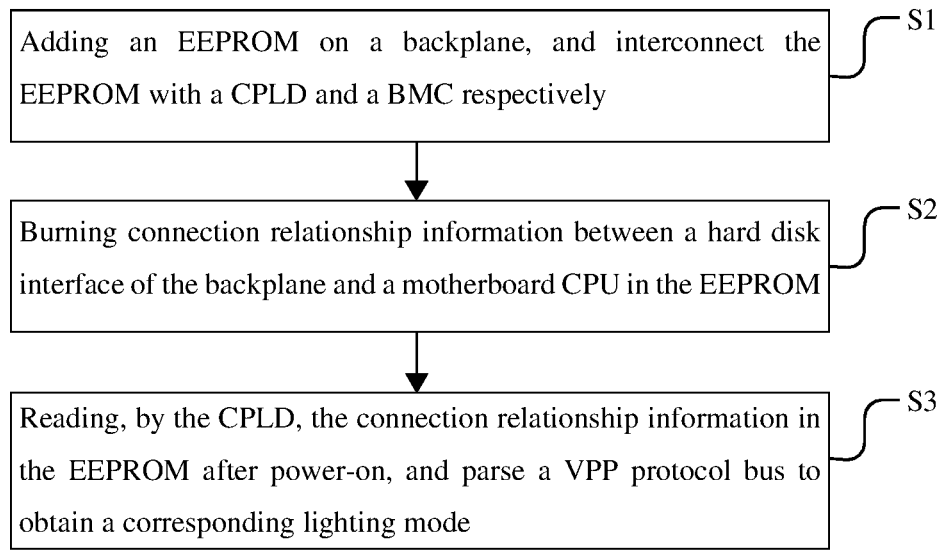
FIG. 1 is a flow chart of a method for flexible deployment and easy CPLD management of a backplane according to an embodiment of the present invention.

In order to clearly illustrate the technical characteristics of the present solution, the present invention will be described in detail below through specific implementations and in conjunction with the accompanying drawings. The following present invention provides many different embodiments or examples for implementing different structures of the present invention. In order to simplify the present invention of the present invention, the components and settings of specific examples are described below. In addition, the present invention may repeat reference numerals and/or letters in different examples. This repetition is for the purpose of simplification and clarity, and does not indicate the relationship between the various embodiments and/or settings discussed. It should be noted that the components illustrated in the drawings are not necessarily drawn to scale. The present invention omits descriptions of well-known components and processing techniques and processes to avoid unnecessarily limiting the present invention.

A method and system for flexible deployment and easy CPLD management of a backplane according to an embodiment of the present invention will be described in detail with reference to the accompanying drawings.

As shown in FIG. 1, an embodiment of the present invention discloses a method for flexible deployment and easy CPLD management of a backplane. The method includes the following operations:

S1. adding an EEPROM on the backplane, and the EEPROM is interconnected with a CPLD and a BMC respectively;

S2. burning a connection relationship information between a hard disk interface of the backplane and a motherboard CPU, in the EEPROM; and S3. the CPLD reading the connection relationship information in the EEPROM after power-on, and parses a VPP protocol bus to obtain a corresponding lighting mode.

According to the embodiment of the present invention, an EEPROM is added on a backplane, interconnection relationship information between the backplane and a motherboard system is burned in the EEPROM, a CPLD and the EEPROM are interconnected, the connection relationship information is read from the EEPROM when power-on, and a motherboard BMC is connected to the EEPROM on the backplane. According to different delivery configurations, the BMC may update the connection relationship information in the EEPROM in real time as required after power-on, thereby eliminating the use of a large number of dial switches.

Figure 2:
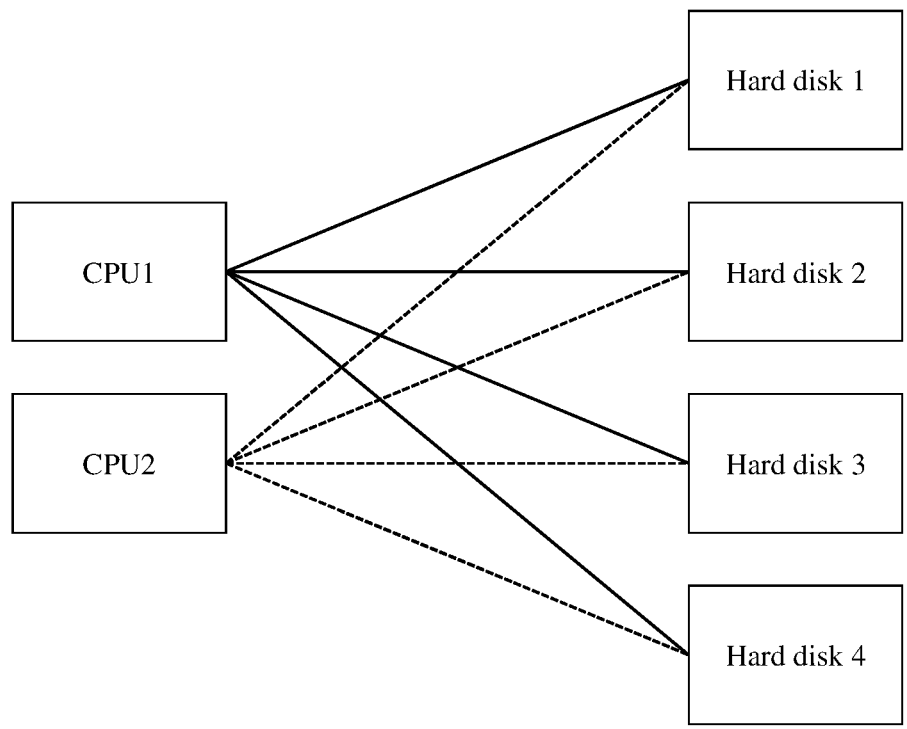
FIG. 2 is a schematic diagram of a double-channel CPU connected to four NVME hard disks according to an embodiment of the present invention.

As shown in FIG. 2, backplanes of four NVME hard disk interfaces and motherboards of two CPUs are taken as an example. The two CPUs are connected to the four NVME hard disk interfaces on a hard disk backplane. Each hard disk has only one CPU connection mode as shown in Table 1.

TABLE 1

|  | Hard disk 1 | Hard disk 2 | Hard disk 3 | Hard disk 4 |
| --- | --- | --- | --- | --- |
| Combination 1 | CPU1 | CPU1 | CPU1 | CPU1 |
| Combination 2 | CPU1 | CPU1 | CPU1 | CPU2 |
| Combination 3 | CPU1 | CPU1 | CPU2 | CPU2 |
| Combination 4 | CPU1 | CPU2 | CPU2 | CPU2 |
| Combination 5 | CPU2 | CPU2 | CPU2 | CPU2 |

Figure 3:
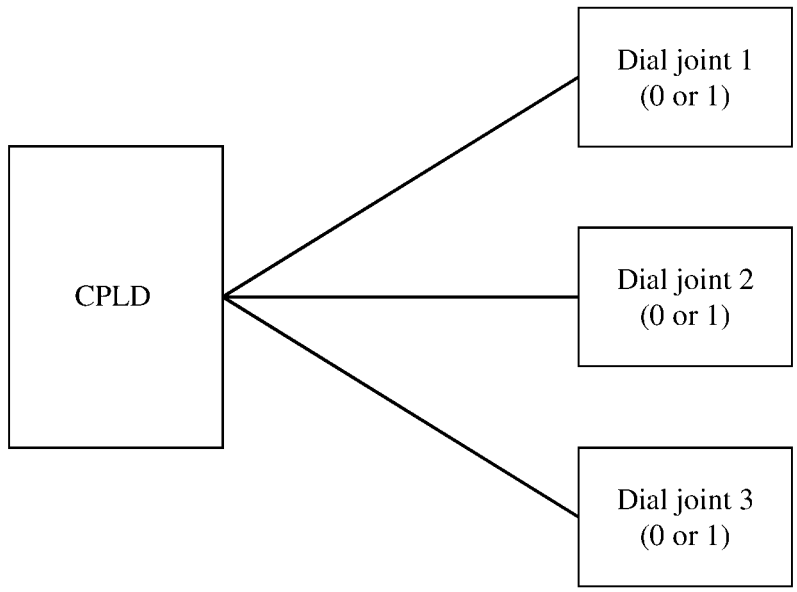
FIG. 3 is a schematic diagram of a CPLD connected to a dial joint according to an embodiment of the present invention.

For five combinations in the table, a CPLD must identify which combination. The previous scheme is that the CPLD needs to add several pins, these pins are connected to dial switches, and the dial switches may dial to a high level or a low level. The CPLD judges different combination modes between the CPU and the NVME hard disk interface by detecting different levels of the pins. As shown in FIG. 3 and Table 2, the CPLD connects three pins to three dial joints of the dial switch, and five combination modes are combined by different high and low levels of the three dial joints, corresponding to five combination modes of the CPU connecting the hard disk.

TABLE 2

|  | Dial joint 1 | Dial joint 2 | Dial joint 3 |
| --- | --- | --- | --- |
| Combination 1 | 0 | 0 | 0 |
| Combination 2 | 0 | 0 | 1 |
| Combination 3 | 0 | 1 | 0 |

TABLE 2-continued

|  | Dial joint 1 | Dial joint 2 | Dial joint 3 |
|---|---|---|---|
| Combination 4 | 1 | 0 | 0 |
| Combination 5 | 0 | 1 | 1 |

By adding an EEPROM on the backplane, the backplane CPLD is connected to the EEPROM through an I2C bus, and the BMC on the motherboard is connected to the EEPROM on the backplane through I2C. Backplane port number information and connection information between the backplane and the motherboard CPU are burned in the EEPROM. After power-on, the CPLD reads connection relationship information from the EEPROM. According to the identified connection relationship information, the CPLD parses a VPP protocol bus, and lighting of the hard disk well corresponds to actual CPU control, as shown in FIG. 4.

Figure 4:
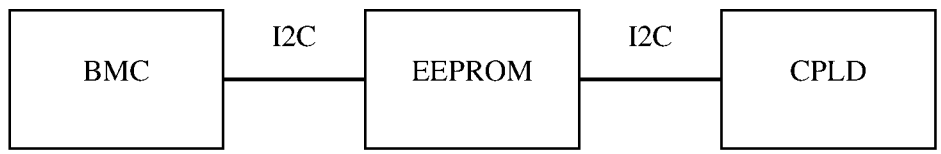
FIG. 4 is a schematic diagram of an EEPROM connected to a CPLD and a BMC according to an embodiment of the present invention.

In FIG. 4, the CPLD is the CPLD on the hard disk backplane described above, and the BMC is a management module. By adding an EPPROM on the hard disk backplane, the module is a storage module, the connection relationship information may be burned into the storage module. When the backplane is powered on, the CPLD reads a configuration relationship of connection between the backplane hard disk interface and the CPU on the motherboard from the EEPROM, and then sends the CPU to the VPP bus of the CPLD for parsing into a corresponding lighting mode. When a connection mode between the CPU and the hard disk interface is changed, the BMC only needs to update configuration content in the EEPROM through an I2C bus, then the whole machine is powered off again and powered on, and the CPLD reads new connection relationship information from the EEPROM to complete a new parsing of the VPP bus. Therefore, the scheme only needs to occupy two pins of the CPLD, and may keep this connection mode unchanged even if the connection mode is more complex. Meanwhile, even if the BMC module on the motherboard is abnormal, the CPLD on the backplane will not be affected from grabbing information from the EEPROM.

According to the embodiment of the present invention, an EEPROM module is added on a backplane, a connection configuration mode of a hard disk backplane and a motherboard controller is stored in the EEPROM module, and a CPLD reads connection relationship information from the EEPROM by means of I2C so as to perform a lighting function and other similar control functions. In addition, by means of adding a connection of a BMC management module on a motherboard to the EEPROM module, when the configuration is changed, a BMC directly upgrades the stored information in the EEPROM module by means of an I2C bus without needing to disassemble a machine. In the present invention, only two pins of the CPLD need to be occupied, without needing to consider that more CPLD pins are required for more complex configurations. In addition, since dial switches need to be manually set, when there are many dial switches, an operator is prone to errors, which causes product configuration errors and product function abnormalities, and the product quality is directly affected. By means of the present invention, the problems may be effectively avoided.

Figure 5:
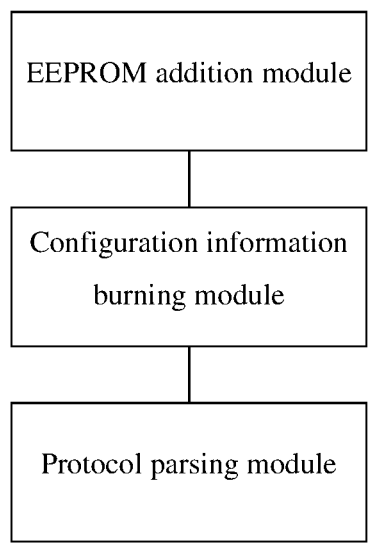
FIG. 5 is a block diagram of a system for flexible deployment and easy CPLD management of a backplane according to an embodiment of the present invention.

As shown in FIG. 5, an embodiment of the present invention also discloses a system for flexible deployment and easy CPLD management of a backplane. The system includes:

an EEPROM addition module, configured to add an EEPROM on the backplane, and interconnect the EEPROM with a CPLD and a BMC respectively;

a configuration information burning module, configured to burn connection relationship information about a connection between a hard disk interface of the backplane and a motherboard CPU in the EEPROM; and a protocol parsing module, configured to read, by the CPLD, the connection relationship information in the EEPROM after power-on, and parse a VPP protocol bus to obtain a corresponding lighting mode.

By adding an EEPROM on the backplane, the backplane CPLD is connected to the EEPROM through an I2C bus, and the BMC on the motherboard is connected to the EEPROM on the backplane through I2C. Backplane port number information and connection information between the backplane and the motherboard CPU are burned in the EEPROM. After power-on, the CPLD reads connection relationship information from the EEPROM. According to the identified connection relationship information, the CPLD parses a VPP protocol bus, and lighting of the hard disk well corresponds to actual CPU control.

The EEPROM module is a storage module, and connection relationship information may be burned into the storage module. When the backplane is powered on, the CPLD reads a configuration relationship of connection between the backplane hard disk interface and the CPU on the motherboard from the EEPROM, and then sends the CPU to the VPP bus of the CPLD for parsing into a corresponding lighting mode. When a connection mode between the CPU and the hard disk interface is changed, the BMC only needs to update configuration content in the EEPROM through an I2C bus, then the whole machine is powered off again and powered on, and the CPLD reads new connection relationship information from the EEPROM to complete a new parsing of the VPP bus. Therefore, the scheme only needs to occupy two pins of the CPLD, and may keep this connection mode unchanged even if the connection mode is more complex. Meanwhile, even if the BMC module on the motherboard is abnormal, the CPLD on the backplane will not be affected from grabbing information from the EEPROM.

The above descriptions are merely the preferred embodiments of the present invention and are not intended to limit the present invention. Any modification, equivalent replacement and improvement within the spirit and principle of the present invention should be contained in the protection scope of the present invention.

What is claimed is:

1. A method for flexible deployment and easy complex programmable logic device (CPLD) management of a backplane, comprising the following operations:

S1, adding an electrically erasable programmable read-only memory (EEPROM) on the backplane, and interconnecting the EEPROM with a CPLD and a baseboard management controller (BMC) respectively;

S2, burning connection relationship information about a connection between a hard disk interface of the backplane and a motherboard central processing unit (CPU) in the EEPROM;

S3, reading, by the CPLD, the connection relationship information in the EEPROM after power-on, and parsing a vector packet processor (VPP) protocol bus to obtain a corresponding lighting mode; and in response to a connection mode between the CPU and the hard disk interface being changed, updating, by the BMC, content of the connection relationship information in the EEPROM through an inter-integrated circuit (I2C) bus, then powering off whole machine again and powering on, and reading, by the CPLD, new connection relationship information from the EEPROM to complete a new parsing of the VPP bus.

2. The method for flexible deployment and easy CPLD management of the backplane according to claim 1, wherein the EEPROM is connected with the CPLD and the BMC through I2C respectively.

3. The method for flexible deployment and easy CPLD management of the backplane according to claim 1, wherein a number of pins occupied in the CPLD is 2.

4. A system for flexible deployment and easy complex programmable logic device (CPLD) management of a backplane, comprising:
an electrically erasable programmable read-only memory (EEPROM) addition module, configured to add an EEPROM on the backplane, and interconnect the EEPROM with a CPLD and a baseboard management controller (BMC) respectively;
a configuration information burning module, configured to burn connection relationship information about a connection between a hard disk interface of the backplane and a motherboard central processing unit (CPU) in the EEPROM;
a protocol parsing module, configured to read, by the CPLD, the connection relationship information in the EEPROM after power-on, and parse a vector packet processor (VPP) protocol bus to obtain a corresponding lighting mode; and
a connection relationship update module, configured to, in response to a connection mode between the CPU and the hard disk interface being changed, update, by the BMC, content of the connection relationship information in the EEPROM through an inter-integrated circuit (I2C) bus, then power off whole machine again and power on, and read, by the CPLD, new connection relationship information from the EEPROM to complete a new parsing of the VPP bus.

5. The system for flexible deployment and easy CPLD management of the backplane according to claim 4, wherein the EEPROM is connected with the CPLD and the BMC through I2C respectively.

6. The system for flexible deployment and easy CPLD management of the backplane according to claim 4, wherein a number of pins occupied in the CPLD is 2.

* * * * *